Patented Feb. 12, 1935

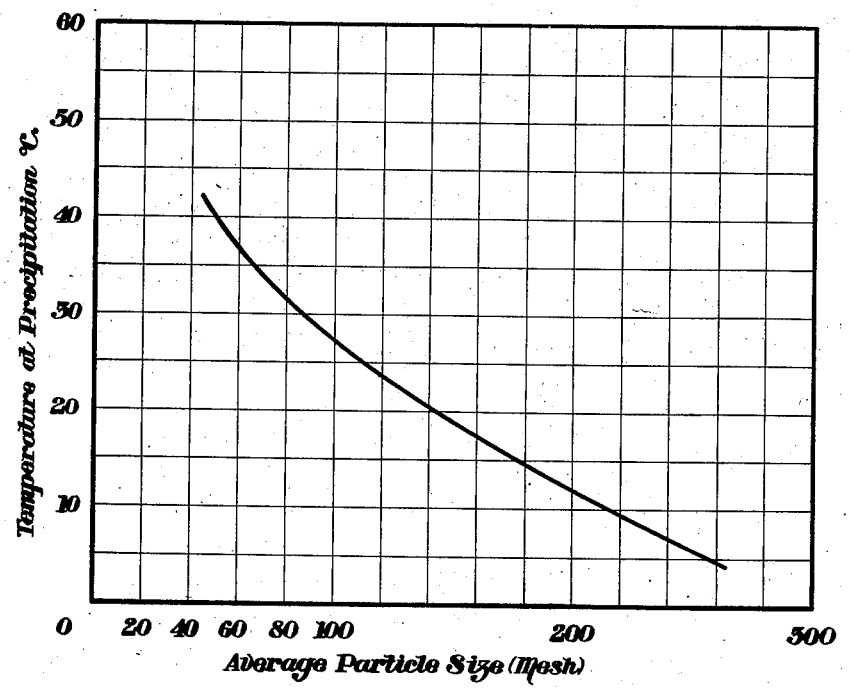

1,991,115

UNITED STATES PATENT OFFICE 1,991,115

PROCESS OF PRODUCING ORGANIC CELLU-
LOSE ESTER MOLDING POWDERS AND
PRODUCT THEREOF

Dennis E. Northrup and Amos W. Crane, Kingsport, Tenn., assignors to Eastman Kodak Company, Rochester, N. Y., a corporation of New York Application July 17, 1931, Serial No. 551,508

10 Claims. (Cl. 106—40)

This invention relates to the production of cellulose organic esters in the form of finely divided, granular powders suitable for molding purposes and more particularly to methods of producing cellulose acetate molding powders. It also relates to methods of producing powders comprising plasticized or unplasticized organic esters of cellulose which may be converted to molding compositions.

It is a matter of common knowledge that cellulose acetate may be precipitated from its acetic acid or acetone solution by the addition of water in excess, cellulose acetate itself being insoluble in water. The material thus produced, especially when precipitated at the normal range of atmospheric temperatures is not as desirable as the molding powder of our invention.

Even though it is possible to precipitate cellulose acetate from solution in the form of light flakes or shreds, it is not suitable for molding operations. For practically all molding purposes the material must be in a finely divided, granular, yet porous, form. Our invention fulfills these requirements and makes cellulose acetate available as a molding powder in a highly desirable form which, due to the open or porous character of its particles, readily occludes or absorbs plasticizers. The same holds true with respect to other organic esters of cellulose which may be produced in a similar fine, granular, but porous, condition.

The principal object of our invention is to provide a method of producing organic esters of cellulose in a finely divided, granular but porous form suitable for use in molding operations. A further object is to provide a simple method of producing cellulose acetate and other cellulose organic ester molding powders having a plasticizer incorporated therein and being in a form which is available without further treatment, for molding purposes. A still further object is to improve upon known processes of precipitating cellulose acetate by the use of certain specific types of precipitating agents not heretofore known or used for this purpose. A specific object of the invention is to provide an improved method of producing a molding powder consisting of mixed higher fatty acid esters of cellulose.

These objects are accomplished by the following invention which includes several methods of precipitating the finely divided granular molding material, although the same basic idea is present in each of them. The essential features of our invention may be said to comprise the formation of a solution or dope of cellulose acetate, cellulose acetate propionate, cellulose propionate or butyrate, cellulose acetate butyrate, cellulose acetate stearate or other organic ester and the precipitation of the ester from its solution by adding an organic precipitant followed by removal of both solvent and precipitant by evaporation or filtration. In the preferred form of the invention a plasticizer is incorporated into the product by adding it to the ester dope before precipitation and, in that modification in which the precipitated cellulose acetate is separated from the solvents by filtration, a sufficient amount of plasticizer is added to the original mixture to provide for a proper quantity being retained by the precipitated esters after filtration to give it the desired qualities.

Taking the production of cellulose acetate molding powder as illustrative, in carrying out our process we first make up a dope by dissolving the proper amount of cellulose organic ester and plasticizer in acetone or other solvent. The solvent will, of course, be selected with reference to its solvent power for the particular ester treated. In like manner the selection of the precipitant will depend upon the particular compounds dealt with. A sufficient amount of a suitable non-solvent for the cellulose acetate, such as toluene is added rapidly to entirely precipitate the cellulose acetate or an amount of the non-solvent, such as toluene, is added which will merely produce jelling of the acetate following which an additional amount of the non-solvent is added, with or without the addition of water, to complete the precipitation. We also find it possible to produce a high grade dense cellulose acetate molding powder with suitable plasticizers intimately combined therewith by adding the desired plasticizer in suitable proportions to the acetone dope followed by the addition of an agent which, while not truly a precipitant in every respect (sometimes called a swelling agent), is sufficient of a non-solvent under ordinary conditions of temperature and pressure to act as a precipitant when added in sufficiently large excess. In this case we remove both the solvent as well as the quasi-precipitant by distillation at either atmospheric or reduced pressure the same as with a true precipitant. This latter operation is normally carried out under practically anhydrous conditions by simple distillation. In some cases it may be desirable to remove the solvent and other agents by steam distillation, although this method is more expensive in that it necessitates the subsequent dehydration of the solvent.

In either method we may remove the solvent and precipitant by filtering the precipitated acetate from the mixture, followed by drying of the powder. In using this method it is necessary to add the plasticizer to the dope in sufficient quantity to leave in the precipitated acetate such an amount of plasticizer as will give the finished product the desired characteristics. In other words, the concentration of the plasticizer in the common solvent should be higher than in the method involving evaporation.

When it is desired to produce a molding powder from a mixed cellulose ester such as cellulose acetate stearate or cellulose acetate propionate, the same general method may be employed, but it is necessary in some instances to use special precipitants and in some cases to employ a slightly different technique. It must be noted here that alcohols higher in the series than ethyl alcohol will not ordinarily give satisfactory results.

In the following examples we have set forth several of the preferred embodiments of our invention which are included merely for purposes of illustration and not as a limitation

*Example I.*—10 grams of acetone soluble cellulose acetate are dissolved in 60 grams of acetone at room temperature. 10 grams of water are added to this solution. This does not effect precipitation but merely economizes the toluene as an acetone solution of cellulose acetate will normally tolerate some water. About 200 c. c. of toluene is then added with thorough agitation. The cellulose acetate thereupon precipitates from the solution in a dense, finely divided powder which is very chalky and resembles wheat flour in appearance, readily absorbs plasticizers and is an excellent molding material.

*Example II.*—A cellulose acetate dope is made up as in Example I, and sufficient toluene is then added to produce jelling of the acetate. At this point sufficient water is added in small quantities to initiate precipitation of the acetate and this is followed by further additions of toluene or water to complete the precipitation. As in Example I the product has physical characteristics and appearance satisfactory for some purposes although large proportions of water and low temperatures of precipitation are to be avoided as otherwise a horny product is apt to result.

*Example III.*—100 grams of cellulose acetate are dissolved in 400 grams of acetone. To the solution is added 30 grams of either dimethyl or diethyl phthalate as a plasticizer. While stirring the resulting dope, 1200 c. c. of toluene is added at room temperature whereupon precipitation of the acetate in finely divided form occurs. The whole mass while still being stirred is then warmed and the acetone and toluene are successively removed and condensed by distillation. The resulting dry powder is very chalky, extremely finely divided and easily molded.

*Example IV.*—As an example of the production of a molding powder from a mixed organic ester of cellulose, a given amount of cellulose acetate stearate containing 40% stearyl is dissolved in 6 parts of acetone. 10 parts of methyl alcohol is then added with high speed stirring. The resulting precipitation brings down a dense, finely divided powder which filters and washes readily. Plasticizers may be incorporated if desired by dissolving them in the acetone solution of the ester and subsequently removing the solvent and precipitant by evaporation.

*Example V.*—20 grams of a fully esterified cellulose acetate propionate containing approximately 18% propionyl was dissolved in 200 c. c. of acetone and 450 c. c. of carbon tetrachloride was added with vigorous stirring. This addition of the carbon tetrachloride produced a jelling of the cellulose acetate propionate whereupon the mixture was diluted by further additions of carbon tetrachloride until a total of 1000 c. c. had been added. The jelled material was thereby reduced to a condition where filtration was easily accomplished. The precipitate was washed with 500 c. c. more of carbon tetrachloride, dried, and the resulting product was a finely divided white powder.

*Example VI.*—100 c. c. of a dope made up as in Example V was treated by the addition of 300 c. c. of butyl alcohol with vigorous stirring. The resulting precipitated product was found to be easily filterable and upon washing with 200 c. c. of butyl alcohol produced an excellent, finely divided powder suitable for molding purposes.

*Example VII.*—100 c. c. of the acetate propionate dope of Example V was treated by the addition of 300 c. c. of iso-propyl ether under the conditions of Example VI. In this case the precipitate required washing with only 100 c. c. of the precipitant to produce the cellulose acetate propionate in the desired finely divided condition.

*Example VIII.*—To 100 c. c. of a dope made up as in Example V was rapidly added 750 c. c. of trichlorethylene which produced a gel. Upon the addition of 200 c. c. more of the trichlorethylene the cellulose acetate propionate precipitated in a finely divided form which, upon washing with 250 c. c. of the precipitant gave a satisfactory powder.

As indicated, acetone is rather a universal solvent for most organic esters of cellulose and it can rather generally be employed. Ethylene chloride is a solvent for the majority of the organic esters of cellulose containing an acid radical higher than acetic. Propylene chloride is also a solvent for most of the higher mixed and single organic esters of cellulose. Numerous others are known to those skilled in the art and published in the literature and need not here be repeated. It is sufficient for the purposes of our invention to state that the particular solvent will be selected with reference to the solubility therein of the specific esters involved. With regard to precipitants, we have found that these agents must be selected with a little more care than in the case of solvents, and no broad general rule can be laid down which will apply to all cases. We may, however, state definitely that the precipitants best suited to our purpose are non-aqueous organic liquids which are also non-solvents for the cellulose organic ester.

Among those compounds which we have found to be good precipitants for cellulose acetate from acetone solutions may be included benzol, toluene, xylene, carbon tetrachloride, methyl, ethyl, and other alcohols, gasoline, kerosene, butane, propane, pentane and hexane. Many of these as well as others are also precipitants for the higher single and mixed organic esters of cellulose; for instance, carbon tetrachloride or toluene will precipitate cellulose acetate propionate from acetone solution.

As discovered by other investigators, normal butyl alcohol, amyl acetate, trichlorethylene, butoxy ethyl alcohol, and propylene chloride may be employed as precipitants for cellulose acetate under certain circumstances. It has likewise been discovered that trichlorethylene, butyl alcohol, iso-propyl ether, and butoxy ethyl alcohol may be employed as precipitants for cellulose acetate propionate under proper conditions. It may be mentioned that when precipitating cellulose acetate propionate with these compounds the ester is first produced in the form of a jell which, after addition of the excess of the precipitating agent, goes over to a finely divided form which is readily dried to give a desirable molding powder. In the case of cellulose acetate stearate, methyl and ethyl alcohols have been found to produce excellent results as precipitants as described and claimed in the application Serial No. 565,829 of C. J. Malm and J. D. Coleman, Jr. A typical example of a precipitant which will precipitate all organic esters of cellulose from solution is iso-propyl ether, as described in the application Serial No. 553,646 of C. J. Malm and C. R. Fordyce.

The selection of both solvents and precipitants depends to a considerable extent upon the solubility or insolubility, as the case may be, of the particular ester which it is desired to produce in the form of a molding powder. The amount of precipitant used will also vary for different esters, especially in the case of those esters which are initially jelled by the action of the precipitant but which, upon the addition of an excess of the precipitant, are produced in the form of a finely divided granular powder. It is also necessary to take into consideration that the precipitating effect of certain non-solvents is considerably affected by the character of the solvent with which it may be used. In other words, when precipitating from a given ester solution, it will be necessary to use a precipitant such that, when added to the solution, its power to precipitate the ester will not be adversely affected by the formation of a binary solvent for the ester. Much of this general character of information is already known to those skilled in the cellulose derivative art and from the foregoing examples it will be apparent that a wide selection of solvents and non-solvents for the various organic esters of cellulose are available. Which particular solvent or precipitant shall be employed with any given organic ester of cellulose can, from the above teachings, be quickly determined in the same manner that one skilled in the art would determine any other physical characteristic of a product.

As one of the features of our invention, we have discovered that there is a quite definite relation between the particle size of the product and the temperature of the solution in which precipitation takes place. We have found that, in general when employing organic precipitants, the lower the temperature, the smaller the particle size. Referring to the drawing, which shows a curve plotted from data obtained in the precipitation of cellulose acetate from a 4:1 acetone dope with toluene it may be seen that when the precipitation is carried out at a temperature of approximately 41° C. the resulting powder will pass a 40-mesh screen, while if the temperature be lowered to 11° C. the material will pass a 200-mesh screen. Somewhat varied results will, of course, obtain with other single and mixed organic esters of cellulose but the broad teaching of temperature control as a means for regulating the size of the precipitated particle applies to the other organic esters of cellulose as well.

We have also found that the composition of the mixture in which precipitation takes place has a pronounced effect upon the completeness of the precipitation of the ester. We have found that as the ratio of toluene, for instance, increases, the more nearly does the precipitation approach completeness. The following table shows the results obtained with several types of cellulose acetate:

*Percent. cellulose acetate precipitated from a 4:1 acetone solution*

| Percent acetone in toluene | 53.5 | 43.5 | 36.5 | 31.6 | 27.8 | Type of cellulose acetate |
|---|---|---|---|---|---|---|
| Percent cellulose acetate precipitated | 93.6 | 97.2 | 98.6 | 98.7 | 99.2 | A. |
|  | 45.0 | 91.7 | 96.6 | 98.3 | 98.6 | B. |
|  | 62.6 | 95.6 | 97.8 | 98.7 | 99.4 | C. |

The above tabulation indicates that with most acetates a little more than 50% toluene is satisfactory and 60–65% should be sufficient to insure substantially complete precipitation. If a larger proportion is necessary for any particular conditions or esters it will be quite apparent from the teaching herein, in what manner this may be controlled.

The product of our invention is characterized and distinguished from known materials of this general class by the fact that it is an extremely finely divided, granular powder, the individual particles of which are nevertheless of a light fluffy and porous nature which readily permits the thorough incorporation of plasticizer. When producing our molding powder in a plasticized condition the precipitant is of course selected with reference to its solvent action on the plasticizer and its non-solvent action upon the cellulose acetate or other cellulose organic ester involved. Since the particles of the ester always precipitate in a light, open condition, the plasticizer solution penetrates the minutest pores and, upon evaporation of the solvent, leaves the plasticizer intimately and thoroughly incorporated therein.

The same open porous character of the material when produced in an unplasticized condition makes possible the ready incorporation of plasticizer by either chemical or mechanical means. For example, the plasticizing agent may be ground into the unplasticized granular material or it may be incorporated from a solution thereof, the latter method being preferable due to the greater penetration and occlusion to be thus obtained. In either case the material is in a finely divided granular form having the general appearance of well ground wheat flour or of baking soda and lends itself readily to the manufacture of a large variety of molded articles.

In addition to dimethyl and diethyl phthalates other typical examples of plasticizers suitable for the purposes of our invention are monochlornaphthalene, triphenyl phosphate, tricresyl phosphate, ethyl acetanilide, ethyl p-toluene sulfonamide. It is to be understood that these are merely intended as examples of some of the best known plasticizers and it will be obvious that many others may be used with satisfactory results.

One general rule will also be observed from the above examples, namely, that where the solvent and the precipitant for the cellulose organic ester are to be removed from the precipitated molding powder by the use of distillation, the precipitant must have a higher boiling point than the boiling point of the solvent in order that the solvent will be distilled off first and leave the precipitant predominating. The reason for this will be obvious, because if the precipitant were to distill off first, the solvent would soon predominate to such an extent that the cellulose derivative would go back into solution. Of course, if the mixed precipitant and solvent is filtered off from the precipitated cellulose ester, this complication does not ordinarily arise as sufficient solvent does not remain in contact with the precipitate to effect solution thereof, even if the precipitant is evaporated off first. However, even in this case, it is better that the precipitant have a higher boiling point than the solvent.

What we claim as our invention, and desire to be secured by Letters Patent of the United States is:

1. The process of producing a finely divided cellulose organic ester molding powder of uniform composition and particle size in granular uncolloidized form, the particles of which have an open, porous, non-fibrous structure, which comprises dissolving the ester in a solvent therefor, adding to the solution with vigorous agitation until the ester is precipitated an organic non-solvent for the ester having a higher boiling point than the solvent, and then subjecting the ester to an increasingly stronger precipitating action by successively evaporating off the solvent and non-solvent.

2. The process of producing a finely divided cellulose organic ester molding powder of uniform composition and particle size in granular uncolloidized form, the particles of which have an open, porous, non-fibrous structure, which comprises dissolving the ester in a solvent therefor, adding to the solution with vigorous agitation until the ester is precipitated an organic non-solvent for the ester having a higher boiling point than the solvent, and selected from the group comprising toluene, xylene, benzene, methyl alcohol, carbon tetrachloride, normal butyl alcohol, iso-propyl ether, trichlorethylene, butoxy ethyl alcohol, and propylene chloride, and then subjecting the ester to an increasingly stronger precipitating action by successively evaporating off the solvent and non-solvent.

3. The process of producing a finely divided cellulose acetate molding powder of uniform composition and particle size in granular uncolloidized form, the particles of which have an open, porous, non-fibrous structure, which comprises dissolving the cellulose acetate in a solvent therefor having a lower boiling point than toluene, adding toluene to the solution with vigorous agitation until the cellulose acetate is precipitated, and then subjecting the cellulose acetate to an increasingly stronger precipitating action by successively evaporating off the acetone and the toluene.

4. The process of producing a finely divided cellulose acetate molding powder of uniform composition and particle size in granular uncolloidized form, the particles of which have an open, porous, non-fibrous structure, which comprises dissolving the cellulose acetate in acetone, adding toluene to the solution with vigorous agitation in an amount representing approximately a ratio of 3:1 with respect to the acetone, whereby the cellulose acetate is precipitated, and then subjecting the cellulose acetate to an increasingly stronger precipitating action by successively distilling off the acetone and toluene.

5. A precipitated, finely divided, granular, uncolloidized organic cellulose ester molding powder of uniform composition and particle size, the particles of which have an open, porous, non-fibrous structure, said powder being of substantially the same character as that produced by the process of claim 1.

6. A precipitated, finely divided, granular, uncolloidized organic cellulose ester molding powder of uniform composition and particle size, the particles of which have an open, porous, non-fibrous structure and having a particle size such that the powder will pass at least a 40-mesh screen, said powder being of substantially the same character as that produced by the process of claim 1.

7. A precipitated, finely divided, granular, uncolloidized cellulose acetate molding powder of uniform composition and particle size, the particles of which have an open, porous, non-fibrous structure, said powder being of substantially the same character as that produced by the process of claim 1.

8. A precipitated, finely divided, granular, uncolloidized cellulose acetate-propionate molding powder of uniform composition and particle size, the particles of which have an open, porous, non-fibrous structure, said powder being of substantially the same character as that produced by the process of claim 1.

9. A precipitated, finely divided, granular, uncolloidized cellulose acetate-stearate molding powder of uniform composition and particle size, the particles of which have an open, porous, non-fibrous structure, said powder being of substantially the same character as that produced by the process of claim 1.

10. A precipitated, finely divided, granular, uncolloidized cellulose acetate molding powder of uniform composition and particle size, the particle size being such that the powder will pass a 40-mesh screen, and the particles thereof having an open, porous, non-fibrous structure and having a plasticizer intimately incorporated therein, said powder being of substantially the same character as that produced by the process of claim 1.

DENNIS E. NORTHRUP.
AMOS W. CRANE.